United States Patent
Tsuda

(10) Patent No.: US 12,062,501 B2
(45) Date of Patent: Aug. 13, 2024

(54) ELECTROLYTIC CAPACITOR

(71) Applicant: Panasonic Intellectual Property Management Co., Ltd., Osaka (JP)

(72) Inventor: Yasuhiro Tsuda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 530 days.

(21) Appl. No.: 17/374,281

(22) Filed: Jul. 13, 2021

(65) Prior Publication Data

US 2021/0343480 A1 Nov. 4, 2021

Related U.S. Application Data

(63) Continuation of application No. 16/909,150, filed on Jun. 23, 2020, now Pat. No. 11,094,471, which is a
(Continued)

(30) Foreign Application Priority Data

Apr. 28, 2015 (JP) .................................. 2015-091448

(51) Int. Cl.
   *H01G 9/035* (2006.01)
   *H01G 9/00* (2006.01)
   (Continued)

(52) U.S. Cl.
   CPC ........... *H01G 9/035* (2013.01); *H01G 9/0036* (2013.01); *H01G 9/0425* (2013.01); *H01G 9/145* (2013.01);
   (Continued)

(58) Field of Classification Search
   None
   See application file for complete search history.

(56) References Cited

U.S. PATENT DOCUMENTS 4,734,821 A    3/1988 Morimoto et al.
6,304,427 B1  10/2001 Reed et al.
(Continued)

FOREIGN PATENT DOCUMENTS

CN    1437752 A    8/2003
CN    101752091 A  6/2010
(Continued)

OTHER PUBLICATIONS

English Translation of Chinese Office Action dated Aug. 19, 2022 for the related Chinese Patent Application No. 201911097518.0.
(Continued)

*Primary Examiner* — Eric W Thomas
(74) *Attorney, Agent, or Firm* — Rimon P.C.

(57) ABSTRACT

An electrolytic capacitor includes a capacitor element and an electrolyte solution. The capacitor element includes: an anode foil on which a dielectric layer is formed; a cathode foil which is opposite to the anode foil; and a conductive polymer layer that is interposed between the anode foil and the cathode foil, conductive polymer layer including a conductive polymer. A conductive layer provided with a carbon layer including conductive carbon is formed on the cathode foil. The conductive polymer layer is a layer formed with use of a dispersion or a solution containing the conductive polymer. And a proportion of water in the electrolyte solution ranges from 0.1% by mass to 6.0% by mass, inclusive.

16 Claims, 1 Drawing Sheet

Related U.S. Application Data continuation of application No. 16/569,889, filed on Sep. 13, 2019, now Pat. No. 10,790,095, which is a continuation of application No. 15/725,353, filed on Oct. 5, 2017, now Pat. No. 10,453,618, which is a continuation of application No. PCT/JP2016/001334, filed on Mar. 10, 2016.

(51) Int. Cl.
  *H01G 9/042* (2006.01)
  *H01G 9/145* (2006.01)
  *H01G 9/15* (2006.01)
  *H01G 9/028* (2006.01)
  *H01G 9/055* (2006.01)

(52) U.S. Cl.
  CPC ............ *H01G 9/151* (2013.01); *H01G 9/028* (2013.01); *H01G 9/055* (2013.01)

(56) References Cited

U.S. PATENT DOCUMENTS

| | | | |
|---|---|---|---|
| 6,307,735 | B1 | 10/2001 | Saito et al. |
| 6,519,137 | B1 | 2/2003 | Nitta et al. |
| 10,453,618 | B2 | 10/2019 | Tsuda |
| 10,790,095 | B2* | 9/2020 | Tsuda ............... H01G 9/0425 |
| 11,094,471 | B2* | 8/2021 | Tsuda ............... H01G 9/145 |
| 2004/0095708 | A1 | 5/2004 | Takeda et al. |
| 2004/0262566 | A1 | 12/2004 | Takaoka et al. |
| 2008/0002334 | A1 | 1/2008 | Kakuma et al. |
| 2008/0218945 | A1 | 9/2008 | Ro et al. |
| 2009/0144954 | A1 | 6/2009 | Furusawa et al. |
| 2011/0080690 | A1 | 4/2011 | Ning et al. |
| 2012/0300368 | A1 | 11/2012 | Matsuura et al. |
| 2013/0027847 | A1 | 1/2013 | Aoyama et al. |
| 2013/0330617 | A1 | 12/2013 | Yoshimura et al. |
| 2015/0213962 | A1 | 7/2015 | Koseki et al. |
| 2016/0148756 | A1 | 5/2016 | Wada et al. |
| 2018/0082798 | A1 | 3/2018 | Tsuda |

FOREIGN PATENT DOCUMENTS

| | | |
|---|---|---|
| JP | 5-029180 A | 2/1993 |
| JP | 10-270291 A | 10/1998 |
| JP | 11-283874 A | 10/1999 |
| JP | 2000-173864 A | 6/2000 |
| JP | 2000-182898 A | 6/2000 |
| JP | 2001-196270 A | 7/2001 |
| JP | 2003-142346 A | 5/2003 |
| JP | 2005-109276 A | 4/2005 |
| JP | 2005-223197 A | 8/2005 |
| JP | 2006-100478 A | 4/2006 |
| JP | 2006-190878 A | 7/2006 |
| JP | 2007-095865 A | 4/2007 |
| JP | 2008-010657 A | 1/2008 |
| JP | 2008-066502 A | 3/2008 |
| JP | 2011-082313 A | 4/2011 |
| JP | 2011-199089 A | 10/2011 |
| JP | 2013-026536 A | 2/2013 |
| JP | 2014-007422 A | 1/2014 |
| JP | 2014-130854 A | 7/2014 |
| JP | 2014-187278 A | 10/2014 |
| JP | 7117552 B2 | 8/2022 |
| WO | 2011/099261 A1 | 8/2011 |
| WO | 2014/021333 A1 | 2/2014 |
| WO | 2014/208607 A1 | 12/2014 |
| WO | 2016/189779 A1 | 12/2016 |

OTHER PUBLICATIONS

Makoto Ue et. al, "Aluminum Anodic Oxide Films formed in Nonaqueous Solutions", Journal of the Surface Science Society of Japan, vol. 19, No. 12, pp. 781-789, 1998.
International Search Report of PCT application No. PCT/JP2016/001334 dated May 24, 2016.
Notice of Allowance issued in U.S. Appl. No. 15/725,353 mailed Jun. 19, 2019.
Final Office Action issued in U.S. Appl. No. 15/725,353 mailed Feb. 4, 2019.
Non-Final Office Action issued in U.S. Appl. No. 15/725,353 mailed Jul. 10, 2018.
Non-Final Office Action issued in U.S. Appl. No. 16/569,889 mailed Dec. 9, 2019.
Notice of Allowance issued in U.S. Appl. No. 16/569,889 mailed Mar. 24, 2020.
English Translation of Chinese Office Action dated Feb. 3, 2021 for the related Chinese201911097518.0.
Non-Final Office Action issued in U.S. Appl. No. 16/909,150 mailed Jul. 24, 2020.
Non-Final Office Action issued in U.S. Appl. No. 16/909,150 mailed Mar. 10, 2021.
Notice of Allowance issued in U.S. Appl. No. 16/909,150 mailed Apr. 13, 2021.

* cited by examiner

ELECTROLYTIC CAPACITOR

CROSS REFERENCE

This application is a Continuation Application of U.S. application Ser. No. 16/909,150 filed on Jun. 23, 2020 which is a Continuation Application of Ser. No. 16/569,889 (now U.S. Pat. No. 10,790,095) filed on Sep. 13, 2019, which is a Continuation Application of U.S. application Ser. No. 15/725,353 (now U.S. Pat. No. 10,453,618) filed on Oct. 5, 2017, which is a continuation of International Application No. PCT/JP2016/001334, dated Mar. 10, 2016, which claims the benefit of Japanese Application No. 2015-091448 filed on Apr. 28, 2015, the entire contents of each are hereby incorporated by reference.

TECHNICAL FIELD

The present disclosure relates to an electrolytic capacitor that includes a capacitor element having a conductive polymer layer, and an electrolyte solution.

BACKGROUND

As small-sized, large capacitance, and low ESR (Equivalent Series Resistance) capacitors, promising candidates are electrolytic capacitors including an anode body on which a dielectric layer is formed and a conductive polymer layer formed so as to cover at least a part of the dielectric layer. In Unexamined Japanese Patent Publication No. 2008-010657, proposes an electrolytic capacitor obtained by impregnating with an electrolyte solution a capacitor element is proposed. The electrolytic capacitor includes an anode foil on which a dielectric layer is formed, a cathode foil, a separator interposed between the anode foil and the cathode foil, and a conductive polymer layer formed on surfaces of the dielectric layer, the separator, and the cathode foil.

In Unexamined Japanese Patent Publication No. 2006-100478, it is proposed that, from the viewpoint of increasing adhesion between aluminum and a carbon-containing layer in a cathode of a solid electrolytic capacitor, an interposing layer including aluminum carbide is formed between the aluminum and the carbon-containing layer, the carbon-containing layer being formed on a surface of the aluminum.

SUMMARY

One aspect of an electrolytic capacitor according to the present disclosure includes: a capacitor element; and an electrolyte solution. The capacitor element includes: an anode foil on which a dielectric layer is formed; a cathode foil which is opposite to the anode foil; and a conductive polymer layer that is interposed between the anode foil and the cathode foil, the conductive polymer layer including a conductive polymer. A conductive layer provided with a carbon layer including conductive carbon is formed on the cathode foil. The conductive polymer layer is a layer formed with use of a dispersion or a solution containing the conductive polymer. And a proportion of water (water content) in the electrolyte solution ranges from 0.1% by mass to 6.0% by mass, inclusive.

According to the aspect of the present disclosure, it is possible to secure a high capacitance, suppress an increase in ESR, and reduce the leakage current in the electrolytic capacitor including the electrolyte solution.

DESCRIPTION OF EMBODIMENTS

Prior to describing exemplary embodiments of the present disclosure, problems in a conventional electrolytic capacitor are described.

In the solid electrolytic capacitor of Unexamined Japanese Patent Publication No. 2006-100478, the carbon-containing layer is provided in the cathode from the viewpoint of increasing a capacitance, and further decrease in ESR is expected from improvement in conductivity of the cathode. On the other hand, in the electrolytic capacitor including the electrolyte solution as in Unexamined Japanese Patent Publication No. 2008-010657, a defect of the dielectric layer formed on the anode can be easily restored so that an increase in a leakage current and a decrease in withstand voltage can be suppressed. However, when a capacitor element in which the carbon-containing layer is formed in the cathode is actually combined with the electrolyte solution, sufficient restoring property is not obtained in some cases. And sufficient adhesion of the carbon-containing layer is unlikely to be secured, which sometimes causes increase of the ESR.

The present disclosure provides an electrolytic capacitor including an electrolyte solution, which can secure a high capacitance and reduce the leakage current while suppressing an increase in ESR.

Hereinafter, exemplary embodiments of an electrolytic capacitor according to the present disclosure are described with appropriate reference to drawings. The exemplary embodiments below, however, are not to limit the present disclosure.

«Electrolytic Capacitor»

Figure 1:
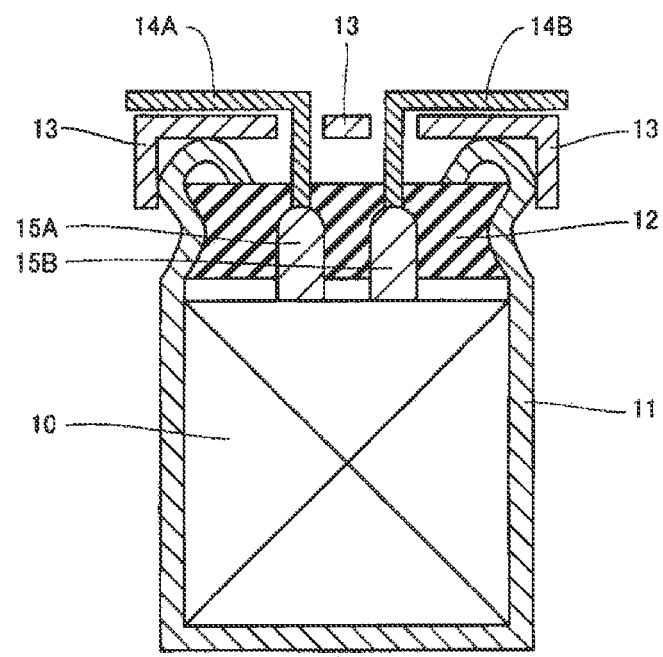
FIG. 1 is a schematic sectional view illustrating an electrolytic capacitor according to one exemplary embodiment of the present disclosure.
Figure 2:
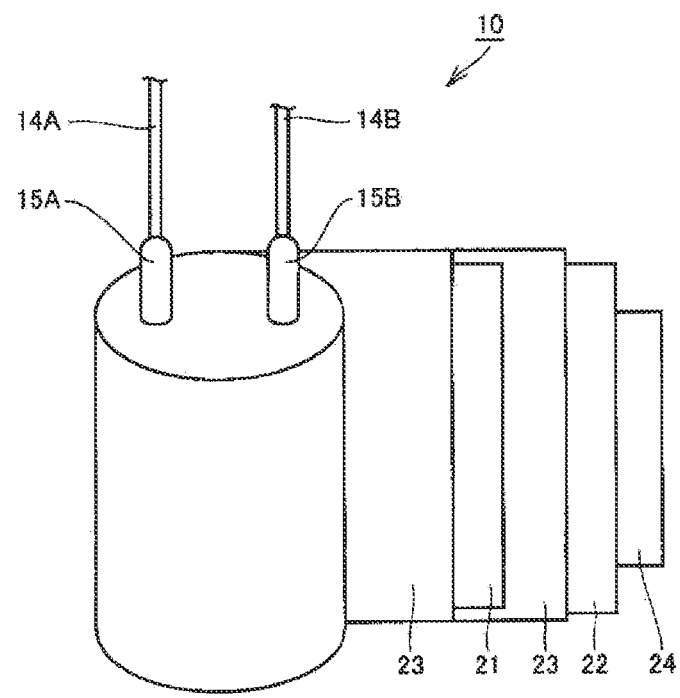
FIG. 2 is a schematic view illustrating a configuration of a capacitor element of the electrolytic capacitor in FIG. 1.

FIG. 1 is a schematic sectional view illustrating an electrolytic capacitor according to one exemplary embodiment of the present disclosure. FIG. 2 is a schematic view illustrating a partially developed capacitor element included in the electrolytic capacitor.

In FIG. 1, the electrolytic capacitor includes capacitor element 10 and capacitor element 10 is housed in an outer case (specifically, bottomed case 11) together with an electrolyte solution (not shown). The outer case includes bottomed case 11 in which capacitor element 10 is housed, insulating sealing member 12 that seals an opening of bottomed case 11, and base plate 13 that covers sealing member 12. Bottomed case 11 is, at a part near an opening end, processed inward by drawing, and is, at the opening end, curled to swage sealing member 12.

As illustrated in FIG. 2, capacitor element 10 includes anode foil 21 connected to lead tab 15A, cathode foil 22 connected to lead tab 15B, and separator 23. Anode foil 21 and cathode foil 22 are wound with separator 23 interposed between the anode foil and the cathode foil. The wound anode foil, cathode foil, and separator are also referred to as a wound body. An outermost periphery of capacitor element 10 is fixed with fastening tape 24. FIG. 2 shows partially developed capacitor element 10 before the outermost periphery of the capacitor element is fixed.

In capacitor element 10, anode foil 21 is a metal foil whose surface is roughened so as to have projections and recesses, and a dielectric layer is formed on the metal foil having the projections and recesses. Cathode foil 22 opposite to anode foil 21 is a metal foil, and a conductive layer is formed on the metal foil. The conductive layer formed on cathode foil 22 includes a carbon layer including conductive carbon. A conductive polymer is attached to at least a part of a surface of the dielectric layer disposed on anode foil 21 and at least a part of a surface of the conductive layer disposed on cathode foil 22 so that a conductive polymer layer is formed. The conductive polymer may be attached to any position between anode foil 21 and cathode foil 22. For example, the conductive polymer covers at least a part of the surface of the dielectric layer formed on anode foil 21 and at least a part of the surface of the conductive layer on cathode foil 22, and may further cover at least a part of a surface of separator 23. As described above, the conductive polymer layer is interposed between anode foil 21 and cathode foil 22.

In the electrolytic capacitor, the conductive polymer (specifically, a film including the conductive polymer) that covers at least a part of the surfaces of, for example, the anode foil, the cathode foil, and the separator is generally referred to as a solid electrolyte layer (or a conductive polymer layer) in some cases.

Hereinafter, a configuration of the electrolytic capacitor according to the exemplary embodiment of the present disclosure is described in more detail.

A capacitor element includes an anode foil on which a dielectric layer is formed, a cathode foil on which a conductive layer is formed, and a conductive polymer layer interposed between the anode foil and the cathode foil. The capacitor element may further include a separator as necessary.

(Capacitor Element)
(Anode Foil)

Examples of the anode foil include a metal foil whose surface is roughened. A type of the metal that constitutes the metal foil is not particularly limited, but it is preferred to use a valve metal such as aluminum, tantalum, or niobium, or an alloy including a valve metal, from the viewpoint of facilitating formation of the dielectric layer.

Roughening the surface of the metal foil can be performed by a publicly known method. By the roughening, a plurality of projections and recesses are formed on the surface of the metal foil. The roughening is preferably performed by subjecting the metal foil to an etching treatment, for example. The etching treatment may be performed by, for example, a DC electrolytic method or an AC electrolytic method.

(Dielectric Layer)

The dielectric layer is formed on a surface of the anode foil. Specifically, the dielectric layer is formed on a roughened surface of the metal foil, so that the dielectric layer is formed along an inner wall surface of pores and pits on the surface of the anode foil.

A method for forming the dielectric layer is not particularly limited, and the dielectric layer can be formed by subjecting the metal foil to an anodizing treatment. The anodizing treatment may be performed by, for example, immersing the metal foil in an anodizing solution such as an ammonium adipate solution. In the anodizing treatment, a voltage may be applied in a state in which the metal foil is immersed in the anodizing solution, as necessary.

Normally, a large metal foil formed of, for example, a valve metal is subjected to the roughening treatment and the anodizing treatment from the viewpoint of mass productivity. In this case, the treated foil is cut into a desired size to arrange anode foil 21 on which the dielectric layer is formed.

(Cathode Foil)

Also for cathode foil 22, a metal foil is used as in the anode foil. A type of the metal is not particularly limited, but it is preferred to use a valve metal such as aluminum, tantalum, or niobium, or an alloy including a valve metal.

When the conductive polymer layer is formed on a surface of the cathode foil with use of a dispersion or a solution containing a conductive polymer, it is possible to obtain a conductive polymer layer having high homogeneity and high flexibility.

(Conductive Layer)

The conductive layer is preferably, as a whole layer, formed of an inorganic material (e.g., a metal, a metal compound, and/or conductive carbon) having conductivity and is distinguished from the conductive polymer layer formed of an organic material. The conductive layer can also be referred to as an inorganic conductive layer because the conductive layer is, as a whole layer, formed of an inorganic material. The conductive layer includes at least a carbon layer in contact with the conductive polymer layer.

The carbon layer includes conductive carbon. Examples of the conductive carbon include amorphous carbon, carbon black such as acetylene black, soft carbon, hard carbon, graphite, and a carbon fiber such as a carbon nanotube. The carbon layer may include one of these conductive carbon materials or two or more of these conductive carbon materials.

The carbon layer may be a layer including the conductive carbon and a binder, but a ratio of the conductive carbon is preferred to be as high as possible. A ratio of the conductive carbon in the carbon layer is preferably 95% by mass or more or 99% by mass or more, for example. The carbon layer may be formed by removing a binder by a heat treatment from a layer including the conductive carbon and the binder. Particularly, the carbon layer is preferably a layer formed of the conductive carbon. Especially, the carbon layer is preferably a deposition film of the conductive carbon (particularly, amorphous carbon).

The conductive layer may include only the carbon layer, and may further include a base layer having conductivity from the viewpoint of increasing the adhesion. The base layer is formed on a surface of the cathode foil, and the carbon layer can be formed on the base layer. When the conductive layer includes the base layer, the carbon layer may be directly formed on a surface of the base layer or may be formed on the base layer with another conductive layer interposed between the base layer and the carbon layer.

The base layer that constitutes a part of the conductive layer includes a non-carbonaceous inorganic material having conductivity such as a metal or a conductive metal compound. Examples of the metal include titanium and/or nickel. As the metal compound, a metal nitride such as titanium nitride is preferable.

As in Unexamined Japanese Patent Publication No. 2006-100478, when the conductive layer formed on the cathode foil includes a carbide component such as aluminum carbide, lifetime characteristics are sometimes decreased. For example, conductive aluminum carbide reacts with water in the electrolytic capacitor (particularly, in the electrolyte solution) to generate methane and insulating aluminum hydroxide. And then the insulating aluminum hydroxide comes to exist between the cathode foil and the conductive polymer layer. The existence of the insulating aluminum hydroxide consequently makes difficult securement of electrical connection between the cathode foil and the conductive polymer layer when charging and discharging are repeated. Therefore, from the viewpoint of increasing the lifetime characteristics, the conductive layer is preferred not to substantially include a carbide component (e.g., aluminum carbide). The carbide component (e.g., aluminum carbide) in the conductive layer is preferably 1% by mass or less.

A thickness of the conductive layer ranges, for example, from 1 nm to 10 μm, inclusive. When the carbon layer is a deposition film, the thickness of the conductive layer may range, for example, from 1 nm to 100 nm, inclusive. When the carbon layer is formed of a layer including the conductive inorganic material and a binder, the thickness of the conductive layer may range, for example, from 100 nm to 10 μm, inclusive. The conductive layer having a thickness in such ranges facilitates securement of high conductivity and a high capacitance.

The thickness of the conductive layer may be an average thickness obtained by averaging thicknesses measured at a plurality of points (e.g., 10 points) in a sectional image.
(Separator)

As separator 23, for example, a nonwoven fabric may be used that includes a fiber of, for example, cellulose, polyethylene terephthalate, a vinylon, or a polyamide (e.g., an aliphatic polyamide and an aromatic polyamide such as aramid).

Capacitor element 10 can be manufactured by a publicly known method. For example, capacitor element 10 may be manufactured by stacking anode foil 21 on which the dielectric layer is formed and cathode foil 22 on which the conductive layer is formed, with separator 23 interposed between the anode foil and the cathode foil, and then forming the conductive polymer layer between anode foil 21 and cathode foil 22. Capacitor element 10 may also be manufactured by winding anode foil 21 on which the dielectric layer is formed and cathode foil 22 on which the conductive layer is formed, with separator 23 interposed between the anode foil and the cathode foil, to form a wound body as illustrated in FIG. 2, and forming the conductive polymer layer between anode foil 21 and cathode foil 22. When the wound body is formed, the winding may be performed while lead tabs 15A, 15B are rolled in the anode foil, the cathode foil, and the separator, to cause lead tabs 15A, 15B to stand up from the wound body as illustrated in FIG. 2.

A material for lead tabs 15A, 15B is not particularly limited as long as the material is a conductive material. Surfaces of lead tabs 15A, 15B may be subjected to an anodizing treatment. Further, lead tabs 15A, 15B may be covered with a resin material at a part in contact with sealing member 12 and a part connected to lead wires 14A, 14B.

A material for lead wires 14A, 14B connected to lead tabs 15A, 15B, respectively, is not also particularly limited, and for example, a conductive material may be used.

An end of an outer surface of anode foil 21, cathode foil 22 or separator 23 that is positioned at an outermost layer of the wound body (cathode foil 22 in FIG. 2) is fixed with fastening tape 24. When anode foil 21 is arranged by cutting a large metal foil, the capacitor element in a state of, for example, the wound body, may further be subjected to an anodizing treatment in order to provide a dielectric layer on a cutting surface of anode foil 21.
(Conductive Polymer Layer)

The conductive polymer layer is interposed between anode foil 21 and cathode foil 22. The conductive polymer layer is preferably formed on at least a part of a surface of the dielectric layer formed on the surface of anode foil 21, so as to cover the dielectric layer. The conductive polymer layer is more preferably formed so as to cover as large a region of the dielectric layer as possible. The conductive polymer layer is preferably formed on at least a part of a surface of the conductive layer formed on the surface of cathode foil 22, so as to cover the conductive layer. The conductive polymer layer is more preferably formed so as to cover as large a region of the conductive layer as possible. When the capacitor element includes the separator, the conductive polymer layer may be formed on not only the surfaces of the dielectric layer and the conductive layer but also a surface of the separator.

Generally, a method for providing the conductive polymer layer is classified to two cases. One case is forming the conductive polymer layer with use of a dispersion obtained by dispersing fine particles of a conductive polymer in a dispersion medium or a solution obtained by dissolving a conductive polymer in a solvent. And the other case is forming the conductive polymer layer by polymerizing a precursor of a conductive polymer (e.g., a monomer or an oligomer that is to be a raw material of the conductive polymer) while the precursor is in contact with the anode foil and the cathode foil.

In the latter case, due to strong reactivity of an oxidant for a polymerization reaction or a monomer itself, the cathode foil and the anode foil corrode to consequently deteriorate contact between the foils and the conductive polymer layer as well as contact between the cathode foil and the conductive layer, and thus decreasing the capacitance may decreases or the ESR increases. An oxidant and a monomer that remain after the polymerization are not sufficiently taken away even by washing to adversely affect a lifetime of the electrolytic capacitor.

In the present disclosure, the conductive polymer layer is formed with use of a dispersion obtained by dispersing fine particles of a conductive polymer in a dispersion medium, or a solution obtained by dissolving a conductive polymer in a solvent. Such a conductive polymer layer is formed by attachment of the conductive polymer to a periphery of the anode foil and the cathode foil through contacting the dispersion or the solution to the anode foil and the cathode foil. By using such a conductive polymer layer, can suppress corrosion of the cathode foil and the anode foil can be suppressed so that the contact of the anode foil and the conductive layer of the cathode foil with the conductive polymer layer can be secured, and further the contact between the cathode foil and the conductive layer can be secured. Accordingly, an increase in ESR can be suppressed, and a high capacitance can easily be secured.
(Conductive Polymer)

Examples of the conductive polymer included in the conductive polymer layer include polypyrrole, polythiophene, polyfuran, polyaniline, polyacetylene, polyphenylene, polyphenylene vinylene, polyacene, and polythiophene vinylene. These conductive polymers may be used alone or in combination of two or more conductive polymers, or may be a copolymer of two or more monomers.

In the present specification, polypyrrole, polythiophene, polyfuran, polyaniline, and the like mean polymers having, as a basic skeleton, polypyrrole, polythiophene, polyfuran, polyaniline, and the like, respectively. Therefore, polypyrrole, polythiophene, polyfuran, polyaniline, and the like also include derivatives of polypyrrole, polythiophene, polyfuran, polyaniline, and the like, respectively. For example, polythiophene includes poly(3,4-ethylenedioxythiophene) and the like.

These conductive polymers may be used alone or in combination of two or more conductive polymers.

A weight average molecular weight of the conductive polymer is not particularly limited and ranges, for example, from 1,000 to 1,000,000, inclusive.

(Dopant)

The conductive polymer layer may include a dopant. The dopant may be included in the conductive polymer layer while doped in the conductive polymer, or may be included in the conductive polymer layer while bound with the conductive polymer.

As the dopant, a polyanion can be used. Specific examples of the polyanion include polyanions such as polyvinylsulfonic acid, polystyrenesulfonic acid, polyallylsulfonic acid, polyacrylsulfonic acid, polymethacrylsulfonic acid, poly(2-acrylamido-2-methylpropanesulfonic acid), polyisoprenesulfonic acid, and polyacrylic acid. Especially, a polyanion derived from polystyrenesulfonic acid is preferable. These polyanions may be used alone or in combination of two or more polyanions. Further, these polyanions may be a polymer of a single monomer or a copolymer of two or more monomers.

A weight average molecular weight of the polyanion is not particularly limited and ranges, for example, from 1,000 to 1,000,000, inclusive. The conductive polymer including such a polyanion is easily and homogeneously dispersed in a solvent and is easily and uniformly attached to the surfaces of the dielectric layer and the conductive layer.

(Electrolyte Solution)

In a solid electrolytic capacitor, by using an electrolyte solution, a property of restoring the dielectric layer is expected to increase to suppress the leakage current. However, when the carbon layer is actually combined with the electrolyte solution, sufficient property of restoring the dielectric layer cannot be obtained in some cases.

On the other hand, even when in an actual combination of the cathode foil on which the conductive layer including the carbon layer is formed, is actually combined with the electrolyte solution, by using the electrolyte solution having a proportion of water of 0.1% by mass or more, an effect of restoring the dielectric layer can be obtained to thus reduce the leakage current.

In the meantime, the electrolyte solution containing water decreases the capacitance or increases the ESR along with lapse of using time of the electrolytic capacitor. These phenomena are considered to be caused by a decrease in adhesion between the cathode foil and the conductive layer including the carbon layer due to the water in the electrolyte solution. Further, in a case of using the electrolyte solution containing water for an electrolytic capacitor having the conductive polymer layer formed by polymerizing a precursor of the conductive polymer while the precursor is in contact with the cathode foil, remained oxidant and precursor become active by an action of the water in the electrolyte solution, so that the foils corrode to decrease the adhesion of the cathode foil to the conductive layer, and the adhesion of the anode foil and the conductive layer to the conductive polymer layer.

In the present exemplary embodiment, the conductive polymer layer is formed with use of the dispersion or the solution containing the conductive polymer, and a proportion of the water in the electrolyte solution is set to 6.0% by mass or less, and thus a decrease in the adhesion of the cathode foil to the conductive layer, and the adhesion of the anode foil and the conductive layer to the conductive polymer layer can be suppressed. Accordingly, an increase in ESR can be suppressed while a high capacitance is secured.

The electrolyte solution having a water of less than 0.1% by mass is inferior in the property of restoring the dielectric layer, so that the leakage current cannot be suppressed. Whereas the electrolyte solution having a water of more than 6.0% by mass increases the ESR. As described above, it is important to set a proportion of the water in the electrolyte solution to a range from 0.1% by mass to 6.0% by mass, inclusive, in the present exemplary embodiment. From the viewpoint of further reducing the ESR, a proportion of the water in the electrolyte solution is preferably 5.0% by mass or less. From the viewpoint of further reducing the leakage current, a proportion of the water in the electrolyte solution is preferably 0.5% by mass or more, more preferably 1.0% by mass or more. Any of these minimum and maximum values can be combined. A proportion of the water in the electrolyte solution may range from 0.1% by mass to 5.0% by mass, inclusive, or from 0.5% by mass to 5.0% by mass, inclusive, for example.

The water in the electrolyte solution is not necessarily contained initially in the electrolyte solution used to assemble the electrolytic capacitor, but the water may be mixed in the electrolyte solution in a process of assembling the electrolytic capacitor. For example, the water may be included in a constituent of the electrolytic capacitor in advance, or may be included in the dispersion liquid or the solution containing the conductive polymer.

The electrolyte solution is not particularly limited as long as the electrolyte solution has the amount of water described above, and a nonaqueous solvent may be used, or a solution may also be used that contains a nonaqueous solvent and an ionic substance (solute) dissolved in the nonaqueous solvent. The nonaqueous solvent is a collective term for liquids other than water and liquids containing water, and includes an organic solvent and an ionic liquid.

Examples of the nonaqueous solvent contained in the electrolyte solution include a polyol (e.g., alkylene glycols such as ethylene glycol and propylene glycol; polyalkylene glycols such as polyethylene glycol; and glycerins such as glycerin and polyglycerin), cyclic sulfones such as sulfolane, lactones such as γ-butyrolactone (γBL), amides such as N-methylacetamide, N,N-dimethylformamide, and N-methyl-2-pyrrolidone, esters such as methyl acetate, ethers such as 1,4-dioxane, ketones such as methyl ethyl ketone, and formaldehyde. A single one or two or more in combination of the nonaqueous solvents may be used.

The electrolyte solution preferably contains at least a solvent (first solvent) having no boiling point or having a high boiling point (e.g., 180° C. or more) among the nonaqueous solvents described above. The electrolyte solution containing the first solvent can suppress depletion of the electrolyte solution even when the electrolytic capacitor is used for a long period, so that it is possible to secure high reliability over a long period.

The boiling point of the first solvent should be 180° C. or more and may be 200° C. or more. As the first solvent, a polyol is preferable. For example, polyethylene glycol and polyglycerin sometimes do not have a boiling point depending on molecular weights of polyethylene glycol and polyglycerin. Such a compound (limited to a liquid, however) is also preferable as the first solvent.

In the meantime, the first solvent is not necessarily contained in the electrolyte solution used to assemble the electrolytic capacitor, but the first solvent may be contained in a treatment solution used in a process of assembling the electrolytic capacitor. For example, the dispersion liquid or the solution containing the conductive polymer may contain the first solvent. The first solvent having no boiling point or having a high boiling point remains in the electrolytic capacitor assembled. The first solvent that has remained oozes into the electrolyte solution housed in the electrolytic capacitor, so that the electrolyte solution in the electrolytic capacitor comes to contain the first solvent. From the viewpoint of easily securing the adhesion between the conductive polymer layer and the conductive layer, a proportion of the first solvent contained in the dispersion is preferably 50% by mass or less of the dispersion or the solution.

The proportion of the first solvent contained in the electrolyte solution preferably ranges from 3% by mass to 90% by mass, inclusive. The electrolyte solution having a proportion of the first solvent in such a range can suppress a decrease in the adhesion between the conductive polymer layer and the conductive layer, and further improve a function of restoring the dielectric layer.

As the solute contained in the electrolyte solution, there can be exemplified a salt of an anion and a cation, and an organic salt is preferable, in which at least one of the anion and the cation is an organic substance. Examples of the organic salt include trimethylamine maleate, triethylamine borodisalicylate, ethyldimethylamine phthalate, mono 1,2,3,4-tetramethylimidazolinium phthalate, and mono 1,3-dimethyl-2-ethylimidazolinium phthalate. A single one or two or more in combination of the solutes may be used.

«Method for Producing Electrolytic Capacitor»

Hereinafter, one example of a method for producing the electrolytic capacitor according to the exemplary embodiment of the present disclosure is described according to each of steps.

The electrolytic capacitor can be obtained through the steps of preparing a dispersion or a solution (first treatment solution) containing a conductive polymer (first step); arranging an anode foil on which a dielectric layer is formed (second step); arranging a cathode foil on which a conductive layer is formed (third step); obtaining a capacitor element by impregnating with the first treatment solution the anode foil, the cathode foil, and a separator interposed between the anode foil and the cathode foil, as necessary (fourth step); and impregnating the capacitor element with an electrolyte solution (fifth step). A conductive polymer layer can be formed through the fourth step. A solvent component may be removed in an appropriate stage.

(i) First Step

In the first step, a first treatment solution is prepared that contains a conductive polymer (and a dopant) and a solvent (second solvent).

The first treatment solution can be obtained by, for example, dispersing or dissolving the conductive polymer (and the dopant) in the second solvent. Alternatively, the first treatment solution can also be obtained by, for example, polymerizing in the second solvent a raw material of the conductive polymer (e.g., a precursor such as a monomer and/or an oligomer of the conductive polymer) in presence of the dopant. In the case of preparing the first treatment solution through polymerization, an unreacted raw material and a byproduct may be removed as necessary. Alternatively, polymerization may be performed with use of a part of the second solvent to give a mixture to which the remaining part of the second solvent is added.

The second solvent is not particularly limited, and may be water or a nonaqueous solvent (e.g., an organic solvent and an ionic liquid). Especially, the second solvent is preferably a polar solvent. The polar solvent may be a protic solvent or an aprotic solvent.

Examples of the protic solvent include a monohydric alcohol (e.g., methanol, ethanol, propanol, and butanol); a polyol (e.g., alkylene glycols such as ethylene glycol and propylene glycol, polyalkylene glycols such as polyethylene glycol, and glycerins such as glycerin and polyglycerin); glycol monoethers such as diethylene glycol monobutyl ether; formaldehyde; and water.

Examples of the aprotic solvent include amides such as N-methylacetamide, N,N-dimethylformamide, and N-methyl-2-pyrrolidone; esters such as methyl acetate; ketones such as methyl ethyl ketone and γ-butyrolactone; ethers (cyclic ethers) such as 1,4-dioxane; sulfones such as dimethyl sulfoxide and sulfolane; and carbonate compounds (e.g., cyclic carbonates) such as propylene carbonate.

Especially, the second solvent is preferably a protic solvent. From the viewpoint of increasing handleability of the first treatment solution and dispersibility of the conductive polymer, the second solvent preferably contains water. The second solvent containing a polyol is likely to increase the conductivity of the conductive polymer layer (in other words, likely to further decrease the ESR). Accordingly, the second solvent containing a polyol is also preferable, and use of the second solvent is also preferable that contains at least water and a polyol.

The first treatment solution is preferably a dispersion obtained by dispersing the conductive polymer (and the dopant) in the second solvent. In the dispersion, the conductive polymer and/or the dopant is preferred to be particles (or a powder). An average particle size of the particles dispersed in the dispersion preferably ranges from 5 nm to 100 nm, inclusive. The average particle size can be determined, for example, from a particle size distribution obtained by a dynamic light scattering method.

A ratio of the dopant contained in the first treatment solution preferably ranges from 10 parts by mass to 1,000 parts by mass, inclusive, more preferably from 50 parts by mass to 200 parts by mass, inclusive, relative to 100 parts by mass of the conductive polymer.

A concentration of the conductive polymer (including the dopant or a polyanion) in the first treatment solution preferably ranges, for example, from 0.5% by mass to 3% by mass, inclusive. The first treatment solution having such a concentration of the conductive polymer is suitable for attachment of an appropriate amount of the conductive polymer and is easily impregnated to also give advantages for productivity improvement.

The first treatment solution may contain, for example, a publicly known additive as necessary.

(ii) Second Step

In the second step, a surface of an anode foil is subjected to, for example, an anodizing treatment to form a dielectric layer on the surface of the anode foil, as described above.

(iii) Third Step

In the third step, a cathode foil is arranged on a surface of which a conductive layer including a carbon layer is formed. More specifically, the carbon layer including conductive carbon can be formed on the cathode foil to form the conductive layer, for example.

The carbon layer may be formed by attaching powder of conductive carbon to the surface of the cathode foil. Alternatively, the carbon layer may also be formed by forming a coated film by coating the surface of the cathode foil with a mixture (e.g., a slurry) containing the conductive carbon and a binder, and drying the coated film or removing the binder by subjecting the coated film to a heat treatment.

The conductive layer including the carbon layer is preferred to be formed by depositing the conductive carbon on the surface of the cathode foil by a gas phase method. Examples of the gas phase method include chemical vapor deposition, vacuum vapor deposition, sputtering, and ion plating.

In the third step, the conductive layer may be formed by forming a base layer on the surface of the cathode foil as necessary and forming, as described above, the carbon layer on the base layer. The base layer constituting the conductive layer can be formed, in the same manner as in the carbon layer, with use of a non-carbonaceous inorganic material having conductivity. The base layer is preferred to be formed by depositing the non-carbonaceous inorganic material having conductivity on the surface of the cathode foil by the gas phase method.

(iv) Fourth Step

In the fourth step, the first treatment solution is impregnated into the anode foil on which the dielectric layer is formed, the cathode foil on which the conductive layer is formed, and a separator as necessary. More specifically, in the fourth step, the first treatment solution may be impregnated into a wound body obtained by winding the anode foil on which the dielectric layer is formed and the cathode foil on which the conductive layer is formed, with the separator interposed between the anode foil and the cathode foil. The impregnation with the first treatment solution may be performed by immersing the wound body in the first treatment solution or injecting the first treatment solution into the wound body.

The impregnation with the first treatment solution may be performed under atmospheric pressure, but may also be performed under a reduced pressure, in an atmosphere ranging, for example, from 10 kPa to 100 kPa, inclusive, preferably from 40 kPa to 100 kPa, inclusive. The impregnation may also be performed under ultrasonic vibration as necessary. An impregnation period depends on a size of capacitor element 10, and ranges, for example, from 1 second to 5 hours, inclusive, preferably from 1 minute to 30 minutes, inclusive.

The anode foil and the cathode foil (and further the separator) may be dried as necessary after impregnated with the first treatment solution. The drying removes at least a part of the second solvent. The drying may be performed by heating, and may also be performed under a reduced pressure as necessary.

As described above, the conductive polymer layer is formed between the anode foil and the cathode foil through the fourth step to thus form capacitor element 10.

(v) Fifth Step

In the fifth step, the capacitor element obtained in the fourth step is impregnated with an electrolyte solution.

The impregnation of capacitor element 10 with the electrolyte solution is not particularly limited and can be performed by a publicly known method. For example, capacitor element 10 may be immersed in the electrolyte solution, or the electrolyte solution may be injected into a container housing capacitor element 10. The impregnation of capacitor element 10 with the electrolyte solution may be performed under a reduced pressure (e.g., 10 kPa to 100 kPa) as necessary.

A proportion of water in the electrolyte solution used is preferred to be appropriately adjusted so that the proportion of water contained in the electrolyte solution after the electrolytic capacitor is assembled is set to the ranges described above.

(Others)

Capacitor element 10 may be encapsulated. More specifically, first, capacitor element 10 is housed in bottomed case 11 so that lead wires 14A, 14B are positioned on an open upper surface of bottomed case 11. As a material for bottomed case 11, there can be used metals such as aluminum, stainless steel, copper, iron and brass, or alloys of these metals.

Next, sealing member 12 formed so as to allow lead wires 14A, 14B to penetrate the sealing member is disposed above capacitor element 10 to encapsulate capacitor element 10 in bottomed case 11. Sealing member 12 is sufficient as long as the sealing member is an insulating substance. As the insulating substance, an elastic body is preferable, and especially preferred is, for example, a high heat resistance silicone rubber, fluororubber, ethylene propylene rubber, chlorosulfonated polyethylene rubber (e.g., Hypalon rubber), butyl rubber or isoprene rubber.

Next, bottomed case 11 is, at a part near an opening end, processed by transverse drawing, and is, at the opening end, curled to swage sealing member 12. Then, base plate 13 is disposed on a curled part of the bottomed case to complete the electrolytic capacitor as illustrated in FIG. 1. Then, an aging treatment may be performed while a rated voltage is applied.

In the exemplary embodiments described above, a wound electrolytic capacitor has been described. The application range of the present disclosure, however, is not limited to the wound electrolytic capacitor and can also be applied to other electrolytic capacitors such as a chip electrolytic capacitor including a metal sintered body in place of the anode foil, and a laminated electrolytic capacitor including a metal plate in place of the anode foil.

EXAMPLES

Hereinafter, the present disclosure is specifically described with reference to examples and comparative examples. The present disclosure, however, is not limited to the examples below.

Example 1

A wound electrolytic capacitor having a rated voltage of 35 V and a rated electrostatic capacity of 47 µF, as illustrated in FIG. 1, was manufactured in the following procedure, and evaluation for the electrolytic capacitor was conducted.

(1) Production of Electrolytic Capacitor
(Preparation of Anode Foil Having Dielectric Layer)

A 100-µm-thick aluminum foil was subjected to an etching treatment to roughen a surface of the aluminum foil. Then, a dielectric layer was formed on the surface of the aluminum foil by an anodizing treatment with an ammonium adipate aqueous solution to arrange an anode foil having the dielectric layer.

(Preparation of Cathode Foil Having Conductive Layer)

A cathode foil was arranged by forming a conductive layer on a surface of a 30-µm-thick aluminum foil through ion plating of conductive carbon. A thickness of the conductive layer was 3 nm.

(Manufacturing of Wound Body)

An anode lead tab and a cathode lead tab were connected to the anode foil and the cathode foil, respectively, and the anode foil and the cathode foil were would with a separator interposed between the anode foil and the cathode foil while the lead tabs were rolled in the anode foil, the cathode foil and the separator, to give a wound body. Ends of the lead tabs protruding from the wound body were connected to an anode lead wire and a cathode lead wire, respectively. Then, the manufactured wound body was subjected to an anodizing treatment again to form a dielectric layer at a cut end of the anode foil. Next, an end of an outer surface of the wound body was fixed with a fastening tape.

(Preparation of First Treatment Solution)

A mixed solution was prepared by dissolving 3,4-ethylenedioxythiophene and a dopant, i.e., polystyrenesulfonic acid in ion-exchanged water. Ferric sulfate and sodium persulfate (an oxidant) dissolved in ion-exchanged water were added to the resultant solution while the solution was stirred, to cause a polymerization reaction. After the reaction, a resultant reaction solution was dialyzed to remove unreacted monomers and an excessive oxidant, so that a dispersion liquid was obtained that included poly(3,4-ethylene dioxythiophene) doped with polystyrenesulfonic acid (PEDOT-PSS). A concentration of PEDOT-PSS in the dispersion liquid was about 2% by mass, and a mass ratio between PSS and PEDOT (=PSS:PEDOT) was about 2:1. Ethylene glycol (second solvent) at 5% by mass was added to the resultant dispersion liquid and stirred to prepare a first treatment solution having a state of a dispersion liquid.

(Impregnation with First Treatment Solution)

The wound body was impregnated with the first treatment solution for 5 minutes. Next, the wound body was heated at 150° C. for 20 minutes to remove a solvent component. Thus, a capacitor element was manufactured in which a conductive polymer layer was formed between the anode foil and the cathode foil.

(Impregnation with Electrolyte Solution)

Next, the capacitor element was impregnated with an electrolyte solution under a reduced pressure. Used as the electrolyte solution was a solution containing γBL, glycerin, and mono(ethyldimethylamine) phthalate (solute) at a mass ratio of 50:25:25. A proportion of water contained in γBL and glycerin used was measured in advance, and the proportion of water in the electrolyte solution was adjusted by adding water to the electrolyte solution or evaporating water by warming so that the water in the electrolyte solution becomes an intended proportion of water. In the electrolyte solution, γBL and glycerin are a first solvent.

(Encapsulation of Capacitor Element)

The electrolyte solution-impregnated capacitor element was housed in an outer case as illustrated in FIG. 1 and encapsulated to manufacture an electrolytic capacitor. A total of 300 electrolytic capacitors were manufactured in the same manner.

(2) Evaluation

Evaluation below was conducted for randomly selected 120 electrolytic capacitors, and an average value was calculated.

(a) Proportion of Water

The electrolyte solution was extracted from the electrolytic capacitor assembled, and the proportion of water (% by mass) in the electrolyte solution was measured by a Karl Fisher method. The measurement result indicated that the proportion of water in the electrolyte solution was 0.10% by mass.

(b) Proportion of First Solvent in Electrolyte Solution

The electrolyte solution was extracted from the electrolytic capacitor, and a proportion (% by mass) of the first solvent contained in the electrolyte solution was measured by gas chromatography. The measurement result indicated that the proportion of the first solvent in the electrolyte solution was 75.0% by mass.

(c) Electrostatic Capacity and ESR Value

An electrostatic capacity (μF) and an ESR value (mΩ) were measured as initial characteristics of the electrolytic capacitor. Specifically, an initial electrostatic capacity (μF) at a frequency of 120 Hz was measured for the electrolytic capacitor with an LCR meter for 4-terminal measurement. In addition, an ESR value (mΩ) at a frequency of 100 kHz was measured for the electrolytic capacitor with an LCR meter for 4-terminal measurement.

Also measured in the same manner as in the initial characteristics described above were an electrostatic capacity (μF) and an ESR value (mΩ) after a test of leaving the electrolytic capacitor to stand at a high temperature of 125° C. for 4000 hours.

The electrostatic capacities and the ESR values were measured for each randomly selected 120 electrolytic capacitors, and average values for the electrostatic capacities and the ESR values were calculated.

(d) Leakage Current (LC)

As the initial characteristics of the electrolytic capacitor, the rated voltage was applied to the electrolytic capacitor and the leakage current (μA) at 2 minutes after the application was measured.

Also measured in the same manner as in the initial characteristics described above was the leakage current (μA) after the test of leaving the electrolytic capacitor to stand at a high temperature of 125° C. for 4000 hours.

Examples 2 to 6 and Comparative Examples 1 to 2

An electrolytic capacitor was manufactured in the same manner as in Example 1 except for adjusting the proportion of water in the electrolyte solution so that the proportion of water in the electrolyte solution of the electrolytic capacitor assembled gave the value indicated in Table 1, and the evaluation was conducted. The proportion of the first solvent in the electrolyte solution of the electrolytic capacitor assembled was as indicated below.

Example 2: 76.0% by mass
Example 3: 75.8% by mass
Example 4: 75.6% by mass
Example 5: 75.7% by mass
Example 6: 75.6% by mass
Comparative Example 1: 75.8% by mass
Comparative Example 2: 75.1% by mass Comparative Example 3

A solution was prepared by mixing 1 part by mass of 3,4-ethylenedioxythiophene as a polymerizable monomer, 2 parts by mass of ferric p-toluenesulfonate that served as an oxidant and a dopant component, and 4 parts by mass of n-butanol as a solvent. A wound body manufactured in the same manner as in Example 1 was immersed in the resultant solution, picked up from the solution and left to stand at 85° C. for 60 minutes to manufacture a capacitor element in which the conductive polymer layer was formed between the anode foil and the cathode foil. An electrolytic capacitor was manufactured in the same manner as in Example 3 except for using the resultant capacitor element, and the evaluation was conducted.

The proportion of the first solvent in the electrolyte solution of the electrolytic capacitor was 74.4% by mass.

Comparative Example 4

In Comparative Example 4, an electrolytic capacitor was manufactured in the same manner as in Example 3 except for not forming a conductive layer on the surface of the aluminum foil, and the evaluation was conducted.

Comparative Example 5

In Comparative Example 5, a solid electrolytic capacitor was manufactured that did not include an electrolyte solution. More specifically, in the same manner as in Example 1, a capacitor element was manufactured in which the conductive polymer layer was formed between the anode foil and the cathode foil. The resultant capacitor element was housed in an outer case and encapsulated to give a solid electrolytic capacitor, and the evaluation was conducted in the same manner as in Example 1.

Table 1 shows results of the examples and the comparative examples. A1 to A6 denote Examples 1 to 6, and B1 to B5 denote Comparative Examples 1 to 5.

TABLE 1

| | Proportion of water in electrolyte solution (% by mass) | Electrostatic capacity (μF) | | ESR (mΩ) | | LC (μA) | |
|---|---|---|---|---|---|---|---|
| | | Initial | After 4000 hours | Initial | After 4000 hours | Initial | After 4000 hours |
| B1 | 0.05 | 55.5 | 49.8 | 63.0 | 120.2 | 4.8 | 330.1 |
| A1 | 0.10 | 55.5 | 49.6 | 63.0 | 100.0 | 4.8 | 15.8 |
| A2 | 0.50 | 55.5 | 49.5 | 63.0 | 97.8 | 4.7 | 9.3 |
| A3 | 1.00 | 55.5 | 49.5 | 63.0 | 98.2 | 4.7 | 7.9 |
| A4 | 3.00 | 55.5 | 49.3 | 63.0 | 98.2 | 4.7 | 7.6 |
| A5 | 5.00 | 55.5 | 49.1 | 65.0 | 100.3 | 4.6 | 7.2 |
| A6 | 6.00 | 55.5 | 49.1 | 65.0 | 122.7 | 4.5 | 7.2 |
| B2 | 8.00 | 55.5 | 48.5 | 70.0 | 153.0 | 4.5 | 7.2 |
| B3 | 1.00 | 55.5 | 49.5 | 72.0 | 255.6 | 4.7 | 8.1 |
| B4 | 1.00 | 47.0 | 43.0 | 63.0 | 120.2 | 4.7 | 7.9 |
| B5 | — | 55.5 | 49.9 | 63.0 | 130.1 | 4.8 | 484.4 |

As shown in Table 1, in the examples, a high electrostatic capacity could be obtained in both the initial measurement and the measurement after the electrolytic capacitor was left to stand at the high temperature for 4000 hours. The initial ESR and leakage current were suppressed low. In Comparative Example 1 where the proportion of water in the electrolyte solution was 0.05% by mass, the effect of restoring the dielectric layer could not sufficiently be obtained, and the leakage current after the electrolytic capacitor was left to stand at the high temperature remarkably increased. In Comparative Example 2 where the proportion of water in the electrolyte solution was 8.00% by mass and in Comparative Example 3 where the conductive polymer layer was formed by polymerization, the ESR after the electrolytic capacitor was left to stand at the high temperature was remarkably higher than in the examples. In Comparative Example 4 where a conductive layer was not provided, the initial electrostatic capacity was lower than in the examples. In Comparative Example 5 where the solid electrolytic capacitor was manufactured, the leakage current increased after the solid electrolytic capacitor was left to stand for 4000 hours.

The present disclosure can be utilized for an electrolytic capacitor that includes a capacitor element having a conductive polymer layer, and an electrolyte solution.

What is claimed is:

1. A method for producing an electrolytic capacitor, the method comprising:
    forming a capacitor element; and
    impregnating the capacitor element with a liquid containing a first solvent having no boiling point or a boiling point of 180° C. or more, wherein:
    the forming of the capacitor element includes:
        preparing an anode foil on which a dielectric layer is formed and a cathode foil provided with a first layer on the cathode foil, the first layer including at least one selected from the group consisting of carbon, nickel, a nickel compound, titanium, and a titanium compound; and
        forming a conductive polymer layer including a conductive polymer between the anode foil and the cathode foil that are disposed to face each other, and
    a proportion of water in the liquid ranges from 0.1% by mass to 6.0% by mass, inclusive.

2. The method according to claim 1, wherein the first layer includes a base layer, the base layer being in contact with the cathode foil.

3. The method according to claim 2, wherein the base layer includes at least one of a metal and a metal compound.

4. The method according to claim 1, wherein the first layer includes a carbon layer, the carbon layer including the carbon.

5. The method according to claim 1, wherein the first layer includes aluminum carbide.

6. The method according to claim 5, wherein a proportion of the aluminum carbide in the first layer is more than 0% by mass and 1% by mass or less.

7. The method according to claim 2, wherein the base layer includes aluminum carbide.

8. The method according to claim 1, wherein a thickness of the first layer ranges from 1 nm to 10 μm, inclusive.

9. The method according to claim 1, wherein a thickness of the first layer ranges from 100 nm to 10 μm, inclusive.

10. The method according to claim 1, wherein the forming of the conductive polymer layer includes forming the conductive polymer layer by using a dispersion or a solution containing the conductive polymer.

11. The method according to claim 1, wherein the first solvent contains a polyol.

12. The method according to claim 1, wherein a proportion of the first solvent contained in the liquid ranges from 3% by mass to 90% by mass, inclusive.

13. The method according to claim 1, wherein the liquid contains a solute.

14. The method according to claim 1, wherein the proportion of water in the liquid ranges from 1.0% by mass to 5.0% by mass, inclusive.

15. The method according to claim 1, wherein the first layer is conductive.

16. The method according to claim 1, wherein the liquid is an electrolyte solution.

* * * * *